United States Patent Office 3,231,569
Patented Jan. 25, 1966

1

3,231,569
1α-HALOMETHYL-16,17-ACETALS AND KETALS
OF THE PREGNANE SERIES AND INTERME-
DIATES THEREFOR
Gerald W. Krakower, Elizabeth, N.J., assignor to Olin
Mathieson Chemical Corporation, New York, N.Y., a
corporation of Virginia
No Drawing. Filed May 19, 1964, Ser. No. 368,711
5 Claims. (Cl. 260—239.55)

This invention relates to and has as its object the provision of novel physiologically active steroids, processes for their production and new intermediates useful in the preparation thereof.

More particularly, this invention relates to the provision of compounds of the formula

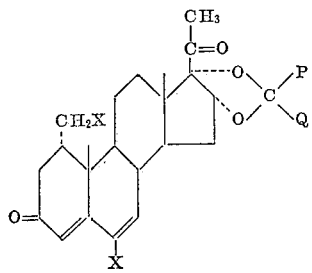

X is halogen (e.g., chloro, fluoro, bromo and iodo); P is selected from the group consisting of hydrogen, lower alkyl, halo lower alkyl, monocyclic aryl, monocyclic aryl lower alkyl, monocyclic heterocyclic or monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; or together with the carbon to which they are joined P and Q is a monocyclic cycloalkyl or monocyclic heterocyclic radical.

The products of this invention are physiologically active substances which possess progestational activity when administered both in the form of tablets and as a solution or suspension and hence can be used in lieu of known progestational agents, such as progesterone, in the treatment of habitual abortion. For this purpose, they can be administered in the same manner as progesterone, for example, the dosage being adjusted for the relative potency of the particular steroid. The compounds of this invention can also be administered perorally in the form of tablets.

The compounds of this invention can be prepared by the process of this invention, entailing a number of steps starting with compounds of the formula

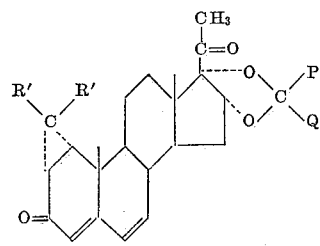

wherein R' may be hydrogen aryl or lower alkyl, and P and Q are as hereinbefore defined.

The starting materials of this invention may be prepared according to the teachings and disclosures of copending application, Serial No. 330,583, filed December 16, 1963, now U.S. Patent 3,174,971 in the names of Gerald W. Krakower and Josef Fried.

The compounds of this invention may be prepared by the processes of this invention employing the starting materials set forth hereinabove. The process of this invention may be represened by the following equations wherein X, R', P and Q are as hereinbefore defined:

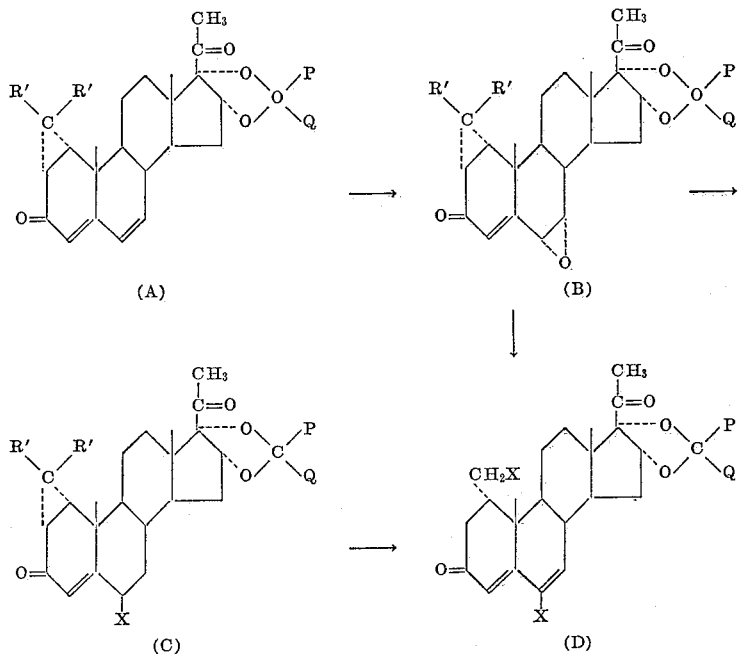

In the first step of the instant invention, the 1α,2α-cyclopropane starting materials (Compounds A) are oxidized as by treatment with a perbenzoic acid, for example, m-chloro perbenzoic acid to yield the 6α,7α-oxido derivatives (Compounds B) of the starting material. Compounds B are new compounds of this invention.

Compounds B may then be treated to directly yield the 1-halomethyl-6-halo derivatives (Compounds D), which are new compounds of this invention, as by treatment with an excess of hydrohalic acid, e.g., hydrochloric or hydrobromic acid at an elevated temperature. Alternatively, Compounds D may be obtained by first reacting Compounds B with one equivalent of a hydrohalic acid, for example, hydrochloric acid at reduced temperatures to produce Compounds C, which are also new compounds of this invention. Compounds C may then be treated with an excess of hydrohalic acid at elevated temperatures to yield the final products of this invention, Compounds D.

The invention may be further illustrated by the following examples:

EXAMPLE 1

*6α,7α-oxido-1α,2α-methylene-16α,17α-(dimethylmethylenedioxy)-Δ⁴-pregnene-3,20-dione*

A solution of 1.00 g. of 1α,2α-methylene-16α,17α-(dimethylmethylenedioxy)-$\Delta^{4,6}$-pregnadiene-3,20 - dione and 2.15 g. of m-chloroperbenzoic acid in 25 ml. of methylene chloride is left at room temperature for twenty-two hours. The reaction mixture is diluted with methylene chloride to a volume of 150 ml. and then washed with five 100 ml. portions of 5% potassium carbonate, two 100 ml. portions of water, 100 ml. of 5% potassium iodide solution, 100 ml. of water, two 100 ml. portions of 5% sodium sulfite solution, 100 ml. of water, dried, and evaporated to give 985 mg. of crude product. Recrystallization from methanol gives 679 mg. of 6α,7α-oxido-1α,2α-methylene-16α,17α - (dimethylmethylenedioxy) - $\Delta^4$ - pregnene-3,20-dione, M.P. 260–262° C. $[\alpha]_D$ +225.7°.

*Analysis.*—Calc'd for $C_{25}H_{32}O_5$: C, 72.79; H, 7.82. Found: C, 72.65; H, 7.80.

Similarly, substituting 1α,2α-diphenylmethylene-16α,17α-(dimethylmethylenedioxy) - $\Delta^{4,6}$ - pregnadiene - 3,20-dione for 1α,2α-methylene-16α,17α-(dimethylmethylenedioxy)-$\Delta^{4,6}$-pregnadiene-3,20-dione and following the procedure of Example 1, there is obtained 6α,7α-oxido-1α,2α-diphenylmethylene - 16α,17α - (dimethylmethylenedioxy)-$\Delta^4$-pregnene-3,20-dione.

EXAMPLE 2

*6-chloro-1α-chloromethyl-16α,17α-(dimethylmethylenedioxy)-$\Delta^{4,6}$-pregnadiene-3,20-dione*

A solution of 200 mg. of 6α,7α-oxido-1α,2α-methylene-16α,17α - (dimethylmethylenedioxy) - $\Delta^4$ - pregnene-3,20-dione in 20 ml. of chloroform saturated with hydrogen chloride is kept at room temperature for five hours. Water is then added and the chloroform layer separated. The organic solution is washed with 5% bicarbonate and then water, dried, and evaporated to give 225 mg. of an oil. After thin layer chromatography (Activity V-alumina) the major band is eluted to give 155 mg. of crystalline material. Recrystallization from methanol gives 85 mg. of 6 - chloro - 1α-chloromethyl-16α,17α(dimethylmethylenedioxy)-$\Delta^{4,6}$-pregnadiene-3,20-dione, M.P. 267–273° C. Further recrystallization gives analytically pure material, M.P. 292–294° C., $\lambda^{EtOH}_{Max.}$ 287 m$\mu$ ($\epsilon$,22,400)

*Analysis.*—Calc'd for $C_{25}H_{32}O_4Cl_2$: C, 64.23; H, 6.90; Cl, 15.17. Found: C, 64.56; H, 6.88; Cl, 15.69.

Similarly, substituting equivalent amounts of hydrogen bromide or hydrogen fluoride for the hydrogen chloride of Example 2, the respective bromo or fluoro derivatives are obtained.

EXAMPLE 3

*6β-chloro-1α,2α-methylene-16α,17α-(dimethylmethylenedioxy)-$\Delta^4$-pregnene-7α-ol-3,20-dione*

A solution of 103 mg. of 6α,7α-oxido-1α,2α-methylene-16α,17α - (dimethylmethylenedioxy) - $\Delta^4$ - pregnene-3,20-dione in 10 ml. of chloroform, is cooled to below 5° C. and treated with 0.9 ml. of chloroform containing one equivalent of hydrochloric acid. The reaction mixture is kept at a temperature below 5° C. for 2½ hours and water is then added. The organic layer is separated and washed with water until neutral, dried and evaporated to give 115 mg. of an oil. Crystallization from methanol gives 75 mg. of 6β-chloro-1α,2α-methylene-16α,17α-(dimethylmethylenedioxy)-$\Delta^4$-pregnene-7α-ol-3,20-dione, M.P. 237–239° C. A further recrystallization raised the melting point to 238–239.5° C., $[\alpha]_D$ +198.3°, $\lambda^{EtOH}_{Max.}$ 236 m$\mu$ ($\epsilon$,16,100)

Similarly, following the procedure of Example 3, but substituting 6α,7α - oxido - 1α,2α-diphenylmethylene-16α,17α-(dimethylmethylenedioxy)-$\Delta^4$-pregnene - 3,20 - dione for 6α,7α - oxido - 1α,2α - methylene-16α,17α-(dimethylmethylenedioxy)-$\Delta^4$-pregnene-3,20-dione there is obtained 6β - chloro - 1α,2α-diphenylmethylene-16α,17α-(dimethylmethylenedioxy)-$\Delta^4$-pregnene-3,20-dione.

Similarly, substituting equivalent amounts of hydrogen bromide or hydrogen fluoride for the hydrogen chloride of Example 2, the respective bromo or fluoro derivatives are obtained.

EXAMPLE 4

*6-chloro-1α-chloromethyl-16α,17α-(dimethylmethylenedioxy)-$\Delta^{4,6}$-pregnadiene-3,20-dione*

Following the procedure of Example 2 but substituting 6β - chloro - 1α,2α - methylene - 16α,17α(dimethylmethylenedioxy)-$\Delta^4$-pregnene-7α-ol-3,20-dione for 6α,7α-oxido-1α,2α-methylene in 16α,17α-(dimethylmethylenedioxy)-$\Delta^4$-pregnene-3,20-dione there is obtained 6-chloro-1α-chloromethyl - 16α,17α - (dimethylmethylenedioxy)-$\Delta^{4,6}$-pregnadiene-3,20-dione.

This invention may be variously otherwise embodied within the scope of the appended claims.

What is claimed is:

1. A compound selected from the group of steroids consisting of the compounds of the formula

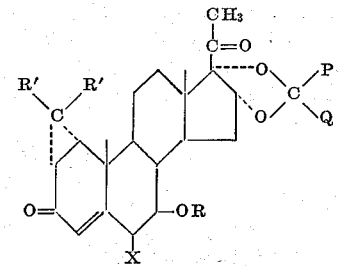

wherein each R' is selected from the group consisting of hydrogen, lower alkyl and aryl; R is selected from the group consisting of hydrogen and acyl; X is halogen; P is selected from the group consisting of hydrogen, lower alkyl, halo lower alkyl, monocyclic aryl, monocyclic aryl lower alkyl, monocyclic heterocyclic and monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; and together with the carbon to which they are joined P and Q is selected from the group consisting of a monocyclic cycloalkyl and monocyclic heterocyclic radical.

2. A compound of the formula

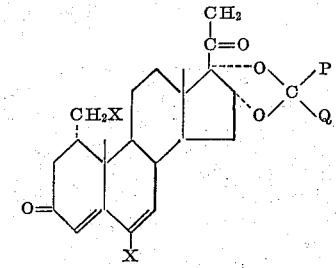

wherein X is halogen; P is selected from the group consisting of hydrogen, lower alkyl, halo lower alkyl, monocyclic aryl, monocyclic aryl lower alkyl, monocyclic heterocyclic and monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; and together with the carbon to which they are joined P and Q is selected from the group consisting of a monocyclic cycloalkyl and monocyclic heterocyclic radical.

3. $6\alpha,7\alpha$ - oxido - $1\alpha,2\alpha$-methylene-$16\alpha,17\alpha$-(dimethylmethylenedioxy)-$\Delta^4$-pregnene-3,20-dione.

4. 6 - chloro - $1\alpha$-chloromethyl-$16\alpha,17\alpha$-(dimethylmethylenedioxy)-$\Delta^{4,6}$-pregnadiene-3,20-dione.

5. $6\beta$ - chloro-$1\alpha,2\alpha$-methylene-$16\alpha,17\alpha$-(dimethylmethylenedioxy)-$\Delta^4$-pregnene-$7\alpha$-ol-3,20-dione.

No references cited.

LEWIS GOTTS, *Primary Examiner.*

UNITED STATES PATENT OFFICE
CERTIFICATE OF CORRECTION

Patent No. 3,231,569                        January 25, 1966

Gerald W. Krakower

It is hereby certified that error appears in the above numbered patent requiring correction and that the said Letters Patent should read as corrected below.

Column 2, for that portion of formulas (A) and (B), each occurrence, reading

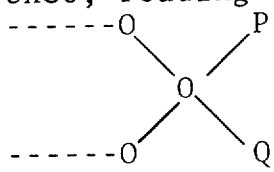      read      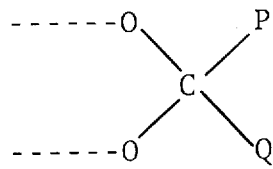

same column 2, for that portion of formula (C) reading

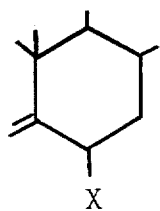      read      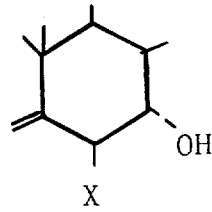

column 4, lines 35 to 45, for that portion of the formula reading

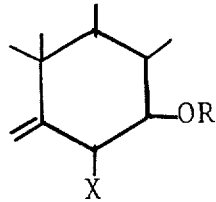      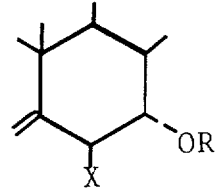

same column 4, lines 62 to 73, for that portion of the formula reading

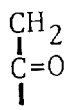      read      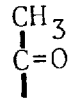

Signed and sealed this 13th day of December 1966.

(SEAL)
Attest:

ERNEST W. SWIDER                      EDWARD J. BRENNER
Attesting Officer                     Commissioner of Patents